United States Patent
Anderson et al.

(10) Patent No.: US 9,323,621 B2
(45) Date of Patent: Apr. 26, 2016

(54) DYNAMIC MONITORING OF COMMAND LINE QUERIES

(71) Applicant: International Business Machines Corporation, Armonk, NY (US)

(72) Inventors: Dale H. Anderson, Tucson, AZ (US); Joshua J. Crawford, Tucson, AZ (US); Paul A. Jennas, II, Tucson, AZ (US); Jason L. Peipelman, Vail, AZ (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/199,776

(22) Filed: Mar. 6, 2014

(65) Prior Publication Data
US 2015/0254138 A1    Sep. 10, 2015

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 11/14 | (2006.01) |
| G06F 17/30 | (2006.01) |

(52) U.S. Cl.
CPC ...... *G06F 11/1435* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 2003/0074446 A1* | 4/2003 | Musante et al. | 709/224 |
| 2003/0115305 A1 | 6/2003 | Murray et al. | |
| 2006/0161395 A1* | 7/2006 | Beam et al. | 702/185 |
| 2007/0192773 A1 | 8/2007 | McCollum et al. | |
| 2012/0059819 A1* | 3/2012 | Wheeler et al. | 707/723 |
| 2012/0317498 A1* | 12/2012 | Logan et al. | 715/752 |

FOREIGN PATENT DOCUMENTS

EP    1392019 B1    1/2006

OTHER PUBLICATIONS

Linux Defenders et al., "Dynamic Command Line Interface", ip.com, Mar. 23, 2009.

* cited by examiner

*Primary Examiner* — H S Sough
*Assistant Examiner* — William C Wood
(74) *Attorney, Agent, or Firm* — Kunzler Law Group

(57) ABSTRACT

A method for dynamic monitoring of command line queries. The method includes receiving a command that includes a query and one or more parameters, mapping the command to a system resource, monitoring for a state change event pertaining to the system resource or a terminal event until a detection of the terminal event, and retrieving one or more characteristics of the system resource in response to detecting the state change event pertaining to the system resource. The system resource has a plurality of characteristics, each characteristic having a name and a value. A state change event corresponds to a change in one or more characteristics of a system resource.

20 Claims, 7 Drawing Sheets

DYNAMIC MONITORING OF COMMAND LINE QUERIES

FIELD

The subject matter disclosed herein relates to the monitoring of command line queries and more particularly relates to dynamic monitoring of command line queries.

BACKGROUND

Command line interfaces allow users to access, control, and manipulate server systems, including determining the state of various system resources. To determine the state of a system resource, a user typically enters a query command into a command line interface, which executes the query and returns the response to the user. For each query, a command line interface returns one response, so monitoring the state of a system resource over a time period requires entering the same query multiple times. Users sometimes write scripts that poll the system to monitor the state of system resources. Polling floods the system with requests and takes up valuable computing resources. In addition, polling requires the comparison of query responses to determine if the state of a system resource has changed.

BRIEF SUMMARY

A computer program product for dynamic monitoring of command line queries is disclosed, the computer program product configured to receive a command having a query and one or more parameters, map the command to a system resource, the system resource having a plurality of characteristics, monitor for a state change event pertaining to the system resource or a terminal event until a detection of the terminal event, and retrieve the one or more characteristics of the plurality of characteristics in response to detecting the state change event. Each characteristic of the plurality of characteristics of a system resource has a name and a value. A state change event corresponds to a change in the value of one or more characteristics of a system resource. In one embodiment, the computer program product retrieving the one or more characteristics of a system resource in response to detecting a state change event includes executing the query accompanying the command. In another embodiment, a state change event contains one or more characteristics of a system resource. In certain embodiments, the computer program product retrieving the one or more characteristics of a system resource in response to detecting a state change event includes extracting the one or more characteristics of a system resource from a state change event.

In some embodiments, the one or more parameters accompanying the command includes a boolean condition. In an embodiment, the computer program product is further configured to display the one or more characteristics of the system resource. In other embodiments, displaying the one or more characteristics of the plurality of characteristics includes displaying the value of each characteristic whose name matches a parameter of the one or more parameters accompanying the command. In certain embodiments, the computer program product is further configured to determine whether the one or more characteristics of the plurality of characteristics satisfy a boolean condition, display the one or more characteristics of the system resource in response to determining whether the one or more characteristics satisfy the boolean condition, and generate a terminal event in response to determining whether the one or more characteristics satisfy the boolean condition. In one embodiment, the one or more parameters accompanying the command includes a time measurement. In another embodiment, the computer program product is further configured to generate the terminal event in response to detecting a passage of time equal to the time measurement.

A method for dynamic monitoring of command line queries is disclosed, the method receiving a command having a query and one or more parameters, mapping the command to a system resource, the system resource having a plurality of characteristics, monitoring for a state change event pertaining to the system resource or a terminal event until a detection of the terminal event, and retrieving the one or more characteristics of the plurality of characteristics in response to detecting the state change event. Each characteristic of the plurality of characteristics of a system resource has a name and a value. A state change event corresponds to a change in the value of one or more characteristics of a system resource. In one embodiment, the method retrieving the one or more characteristics of a system resource in response to detecting a state change event includes executing the query accompanying the command. In another embodiment, a state change event contains one or more characteristics of a system resource. In certain embodiments, the method retrieving the one or more characteristics of a system resource in response to detecting a state change event includes extracting the one or more characteristics of a system resource from a state change event.

In some embodiments, the one or more parameters accompanying the command includes a boolean condition. In an embodiment, the method further includes displaying the one or more characteristics of the system resource. In other embodiments, displaying the one or more characteristics of the plurality of characteristics includes displaying the value of each characteristic whose name matches a parameter of the one or more parameters accompanying the command. In certain embodiments, the method further includes determining whether the one or more characteristics of the plurality of characteristics satisfy a boolean condition, displaying the one or more characteristics of the system resource in response to determining whether the one or more characteristics satisfy the boolean condition, and generating a terminal event in response to determining whether the one or more characteristics satisfy the boolean condition. In one embodiment, the one or more parameters accompanying the command includes a time measurement. In another embodiment, the method further includes generating the terminal event in response to detecting a passage of time equal to the time measurement.

A system for dynamic monitoring of command line queries is disclosed, the system including a server, a command line interface configured to receive a command that includes a query a one or more parameters, and a monitoring apparatus that includes: a resource identification module, a listener module, and a data collection module. The resource identification module maps the command to a system resource, the system resource having a plurality of characteristics, wherein each characteristic of the plurality of characteristics includes a name and a value. The listener module monitors for a state change event pertaining to the system resource or a terminal event until a detection of the terminal event, the state change event corresponding to a change in the value of one or more characteristics of the plurality of characteristics. The data collection module retrieves the one or more characteristics of the plurality of characteristics in response to the listener module detecting the state change event.

In one embodiment, the data collection module retrieves the one or more characteristics of the plurality of characteristics in response to the listener module detecting the state change event includes executing the query. In another embodiment, the state change event contains one or more characteristics of the plurality of characteristics, and the data collection module retrieves the one or more characteristics of the plurality of characteristics in response to the listener module detecting the state change event includes extracting the one or more characteristics of the plurality of characteristics from the state change event.

In an embodiment, the one or more parameters accompanying the command includes a boolean condition, and the system further includes an evaluation module, an output module, and a signal module. The evaluation module determines whether the one or more characteristics of the plurality of characteristics satisfy the boolean condition. The output module displays the one or more characteristics of the plurality of characteristics in response to the evaluation module determining whether the one or more characteristics of the plurality of characteristics satisfy the boolean condition. The signal module generates a terminal event in response to the evaluation module determining whether the one or more characteristics of the plurality of characteristics satisfy the boolean condition.

In some embodiments, the system also includes an output module that displays the one or more characteristics of the plurality of characteristics. In another embodiment, the output module displays the one or more characteristics of the plurality of characteristics includes displaying the value of each characteristic whose name matches a parameter of the one or more parameters accompanying the command.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
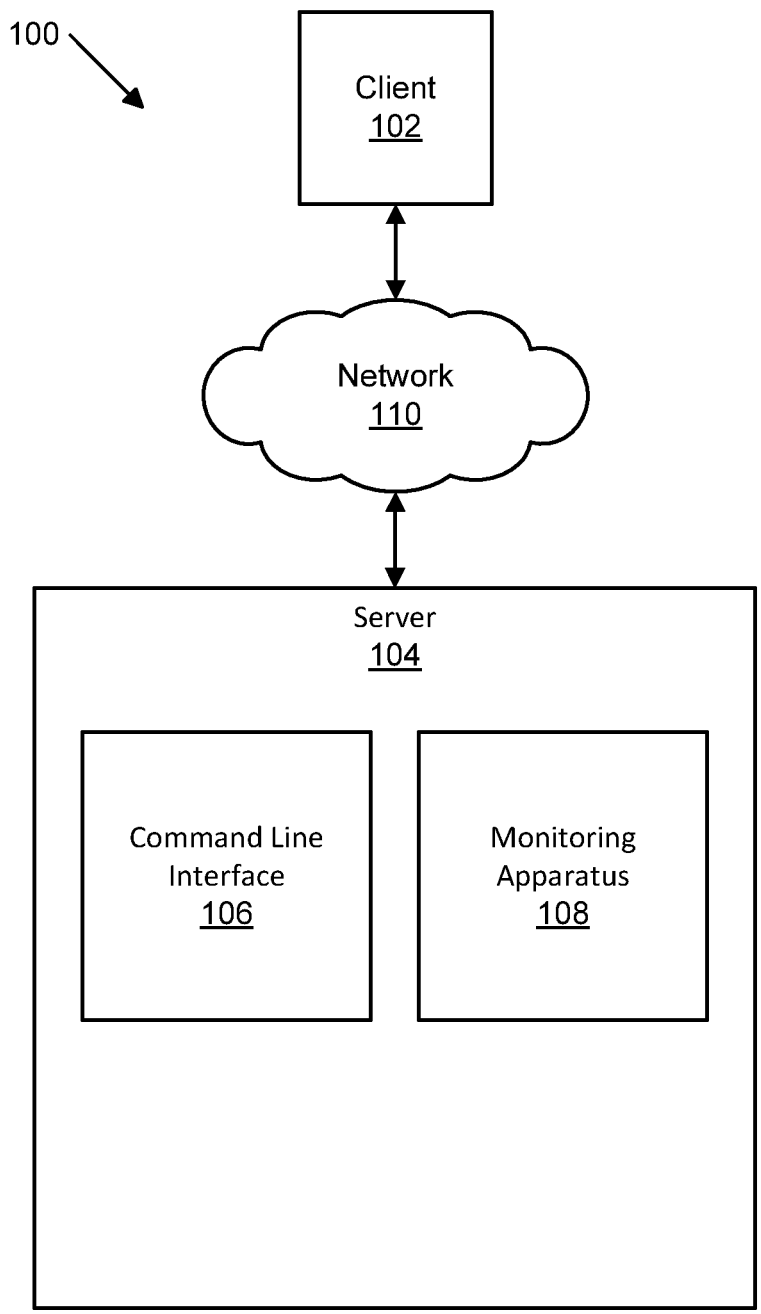
FIG. 1 is a schematic block diagram illustrating one embodiment of a system for dynamic monitoring of command line queries.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements. Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1 is a schematic block diagram illustrating one embodiment of a system 100 for dynamic monitoring of command line queries. The system 100 includes a client 102, a server 104, a command line interface 106, a monitoring apparatus 108, and a network 110, which are described below.

The system 100, in one embodiment, includes a server 104 with a command line interface 106 and a monitoring apparatus 108. The server may be any computer accessible by a client 102 over a network 110, including but not limited to a database server, a mainframe server, a workstation, a desktop computer, etc. The client 102 may be any electronic device with a display and the ability to accept user input that capable of accessing the server 104. For example, the client 102 may be a laptop or desktop computer, a tablet, a smartphone, a television, etc. The network 110 may include a local area network ("LAN"), a wide area network ("WAN"), wireless network, cellular network, the Internet, a fiber optic network, or the like. In one embodiment, the network 110 includes multiple networks. For example, the network 110 may include a cellular network along with another network capable Internet connection. In another example, the network 110 includes a wireless network along with a wired network. The network 110 may include switches, routers, servers, cabling and other equipment known to those in the art.

A command line interface 106 is a tool for interacting with a system 100 by typing commands to perform specific tasks. One class of command that may be entered by a user (whether human or machine) is a query command. Query commands are commands that request a state of one or more resources within a system 100. A system resource may be a physical object (e.g., disk drive, memory, CPU) or a logical object (e.g., logical disk volume, virtual memory, active software process). A system resource has one or more characteristics, each characteristic having a name and a value. For example, a system hard disk may have a characteristic called "free space" with a value of 12 GBs. As another example, server port may have a characteristic called "throughput" with a value of 300 MB/s.

In one embodiment, a query command may be accompanied by one or more command flags, parameters, or both. A command flag modifies the behavior of a query command. In an embodiment, a command flag may also signify the type (e.g., text string, number, boolean) of one or more parameters accompanying the query command. A parameter is a variable that can modify the behavior of a query command or a command flag. In some embodiments, a parameter can be a boolean condition (e.g., "state"=running; "%complete">75). In another embodiment, a parameter can be a text string. For example, a parameter may be a name of a system resource or system resource characteristic. In certain embodiments, a parameter can be a number. For example, a parameter may be a measurement of time, size, progress, or rate.

Figure 2:
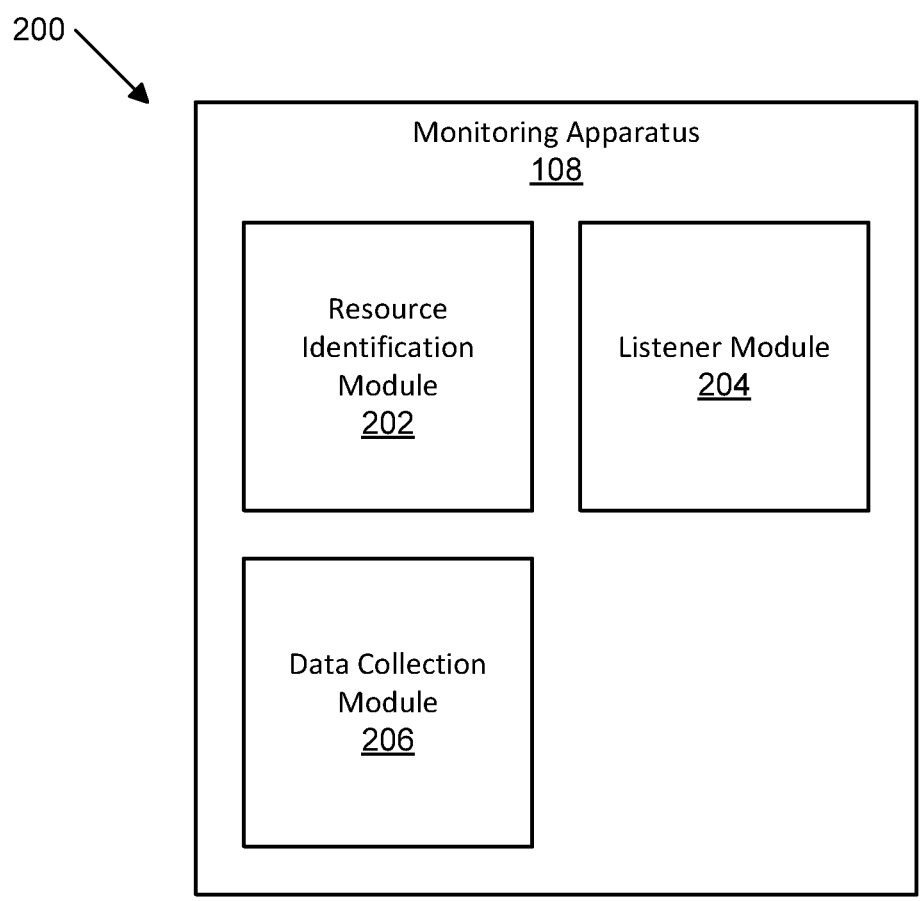
FIG. 2 is a schematic block diagram illustrating one embodiment of an apparatus for dynamic monitoring of command line queries.

FIG. 2 is a schematic block diagram illustrating one embodiment of an apparatus 200 for dynamic monitoring of command line queries. The apparatus 200 includes one embodiment of a monitoring apparatus 108 with a resource identification module 202, a listener module 204, and a data collection module 206, which are described below.

The resource identification module 202 maps a command to one or more system resources on the server 104. In one embodiment, the resource identification module 202 maps a command to the one or more system resources by executing the query accompanying the command and examining the query response. In another embodiment, the resource identification module 202 maps a command to the one or more system resources by looking up the one or more system resources corresponding to the query accompanying the command in a reference file or database. In yet another embodiment, the resource identification module 202 maps a command to the one or more system resources by examining the one or more parameters accompanying the command.

The listener module 204 monitors for a state change event pertaining to one or more system resources or a terminal event until a detection of the terminal event. A state change event is a signal indicating a change in one or more characteristics of a system resource. Sometimes, a state change event contains an updated value for one or more characteristics of the system resource corresponding to the state change event. In one embodiment, the listener module 204 registers with the server 104 operating system to receive state change events associated with one or more system resources. In this embodiment, the listener module 204 leverages events and/or interrupts generated by an operating system's event handling framework to be notified of changes in the state (i.e., a value of one or more characteristics) of a system resource. Alternatively, if an operating system's event handling framework does not produce events and/or interrupts for certain system resources or state changes, the listener module 204 polls the system resource to determine whether its state has changed. A terminal event is a signal that causes the listener module 204 to stop monitoring for any events. A terminal event can be generated by the server 104 operating system, a process running on the server 104, or a user. An example of a terminal event generated by the server 104 operating system is an error message thrown by the operating system when the query is executed. A user may generate a terminal event through a keyboard, mouse, or other input device (e.g., pressing the <ESC> key).

The data collection module 206 retrieves one or more characteristics of a system resource in response to the listener module 204 detecting a state change event. In one embodiment, the data collection module 206 retrieves one or more characteristics of a system resource by executing the query accompanying the command. In this embodiment, the query response contains the one or more characteristics of the system resource mapped to the query. In another embodiment, the data collection module 206 retrieves the one or more characteristics of a system resource by extracting the one or more characteristics from the state change event generated by the underlying event handling framework.

Figure 3:
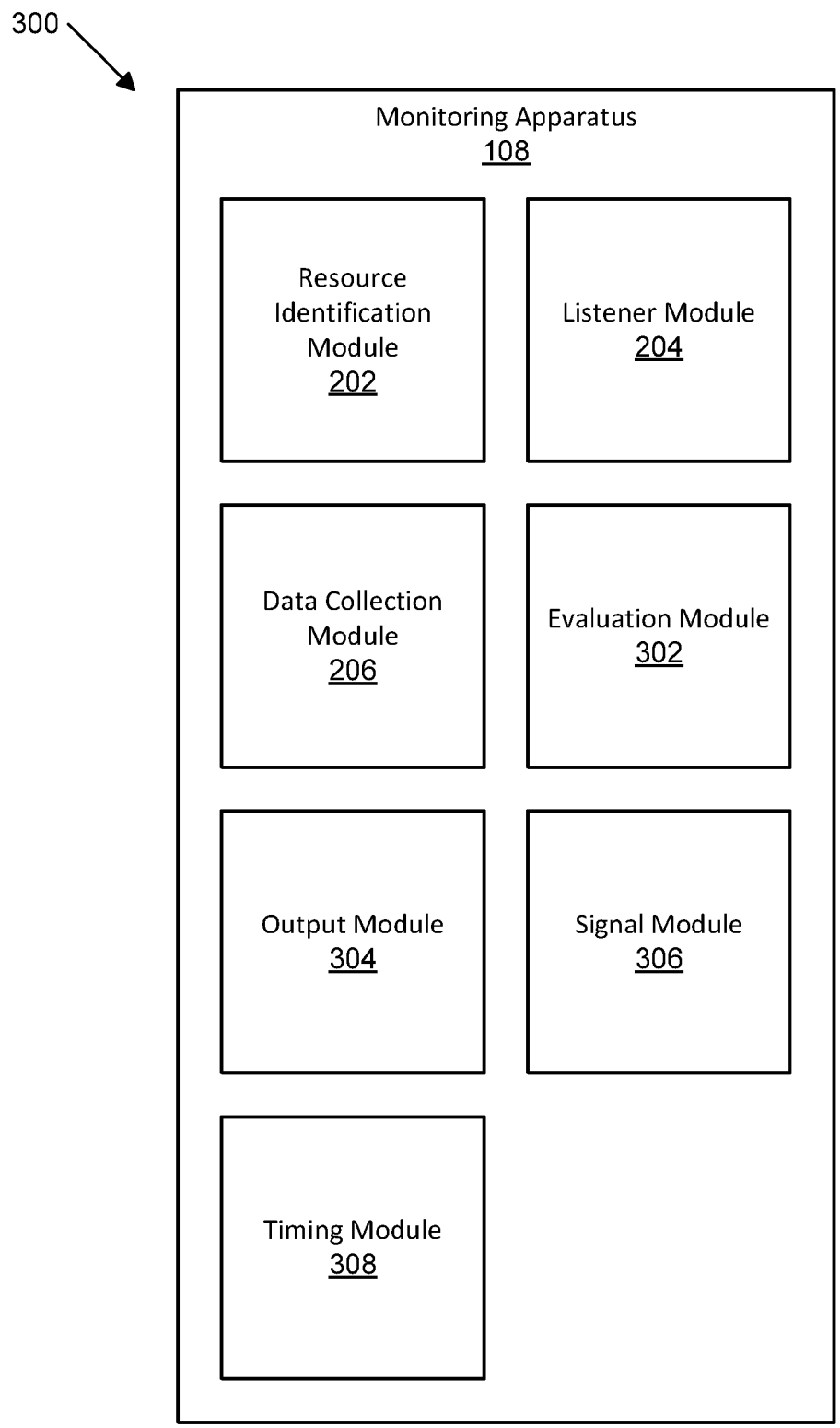
FIG. 3 is a schematic block diagram illustrating one embodiment of another apparatus for dynamic monitoring of command line queries.

FIG. 3 is a schematic block diagram illustrating one embodiment of another apparatus 300 for dynamic monitoring of command line queries. The apparatus 300 includes another embodiment of a monitoring apparatus 108 with a resource identification module 202, a listener module 204, and a data collection module 206, which are substantially similar to those described above in relation to apparatus 200 in FIG. 2. The apparatus 300 also includes an evaluation module 302, an output module 304, a signal module 306, and a timing module 308, described below.

In one embodiment, where the one or more parameters accompanying the command includes a boolean condition, the evaluation module 302 determines whether the one or more characteristics of the plurality of characteristics retrieved by the data collection module 206 satisfies the boolean condition. In this embodiment, the evaluation module 302 determines whether the one or more retrieved characteristics satisfies the boolean condition by finding a characteristic of the one or more retrieved characteristics whose name matches the variable within the boolean condition. The evaluation module 302 then substitutes the value corresponding to the characteristic whose name matches the variable into the boolean condition and evaluates the boolean condition. For example, given a boolean condition of "%complete>65," the evaluation module 302 finds a characteristic of the one or more retrieved characteristics with a matching name ("%complete"), substitutes the value of this characteristic into the boolean condition, and evaluates the boolean condition to return true or false. In some embodiments, the one or more parameters accompanying the command include a plurality of boolean conditions, and the evaluation module 302 determines whether the one or more characteristics of the plurality of characteristics retrieved by the data collection module 206 satisfies the plurality of boolean conditions.

The output module 304 displays a state of one or more system resources to the user. In one embodiment, the output module 304 display the one or more characteristics of the plurality of characteristics retrieved by the data collection module 206. In certain embodiments, the output module 302 displays the one or more characteristics of the plurality of characteristics retrieved by the data collection module 206 whose name matches a parameter of the one or more parameters accompanying the command. In another embodiment, where the one or more parameters accompanying a command includes a boolean condition, the output module 304 displays one or more characteristics of the plurality of characteristics retrieved by the data collection module 206 to the user in response to the evaluation module 302 determining whether the one or more characteristics retrieved by the data collection module 206 satisfies the boolean condition.

The signal module 306 generates a terminal event. In one embodiment, the signal module 306 generates a terminal event in response to the output module 304 displaying one or more characteristics of the plurality of characteristics retrieved by the data collection module 302. In another embodiment, where the one or more parameters accompanying a command includes a boolean condition, the signal module 306 generates a terminal event in response to the evaluation module 302 determining whether the one or more characteristics of the plurality of characteristics satisfy the boolean condition. In still another embodiment, where the one or more parameters includes a time measurement, the signal module 306 generates a terminal event in response to detecting a passage of time equal to the time measurement. In this embodiment, the signal module 306 receives a command from the timing module 308, described below, to generate the terminal event.

The timing module 308 tracks a passage of time and sends a command to the signal module 306 in response to a passage of a set time period. In one embodiment, where the one or more parameters accompanying the command includes a time measurement, the timing module 308 tracks a passage of time and sends a command to the signal module 306 in response to a passage of time equal to the time measurement.

Figure 4:
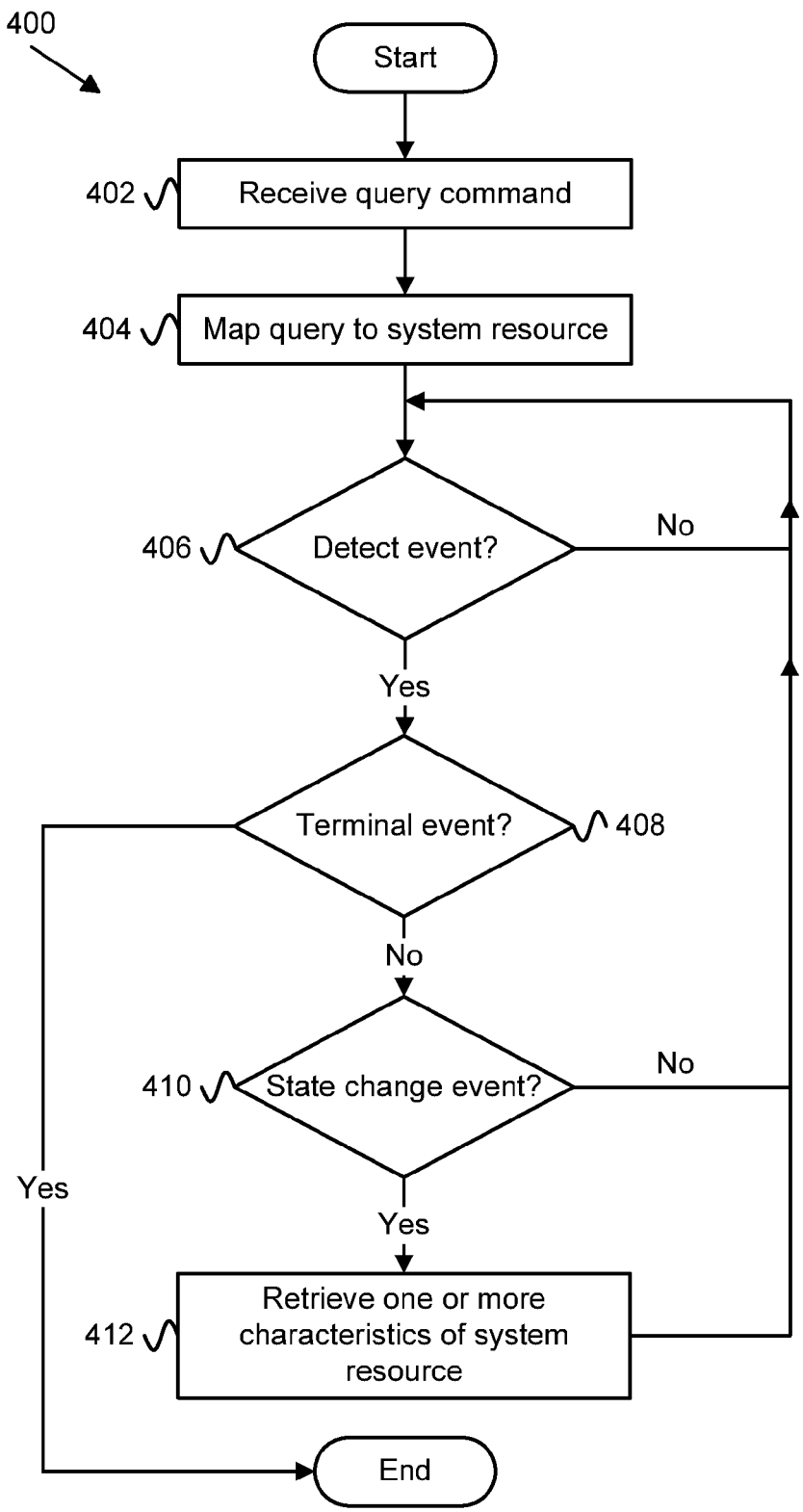
FIG. 4 is a schematic flow chart illustrating one embodiment of a method for dynamic monitoring of command line queries.

FIG. 4 is a schematic flow chart illustrating one embodiment of a method 400 for dynamic monitoring of command line queries. The method 400 begins and receives 402 a query command from a user. In one embodiment, the query command includes one or more of a command flags, parameters, or both. The method 400 maps 404 the query command to one or more system resources. The method 400 monitors for a state change event or a terminal event until a detection of a terminal event. The method determines 406 whether an event has been detected. If so, the method determines 408 whether the detected event is a terminal event. If the detected event is a terminal event, the method 400 ends. If the detected event is not a terminal event, the method 400 determines 410 whether the detected event is a state change event. If the detected event is a state change event, the method 400 retrieves 412 the one or more characteristics of the system resource that the state change event pertains to and then continues to monitor for a state change event or terminal event.

Figure 5:
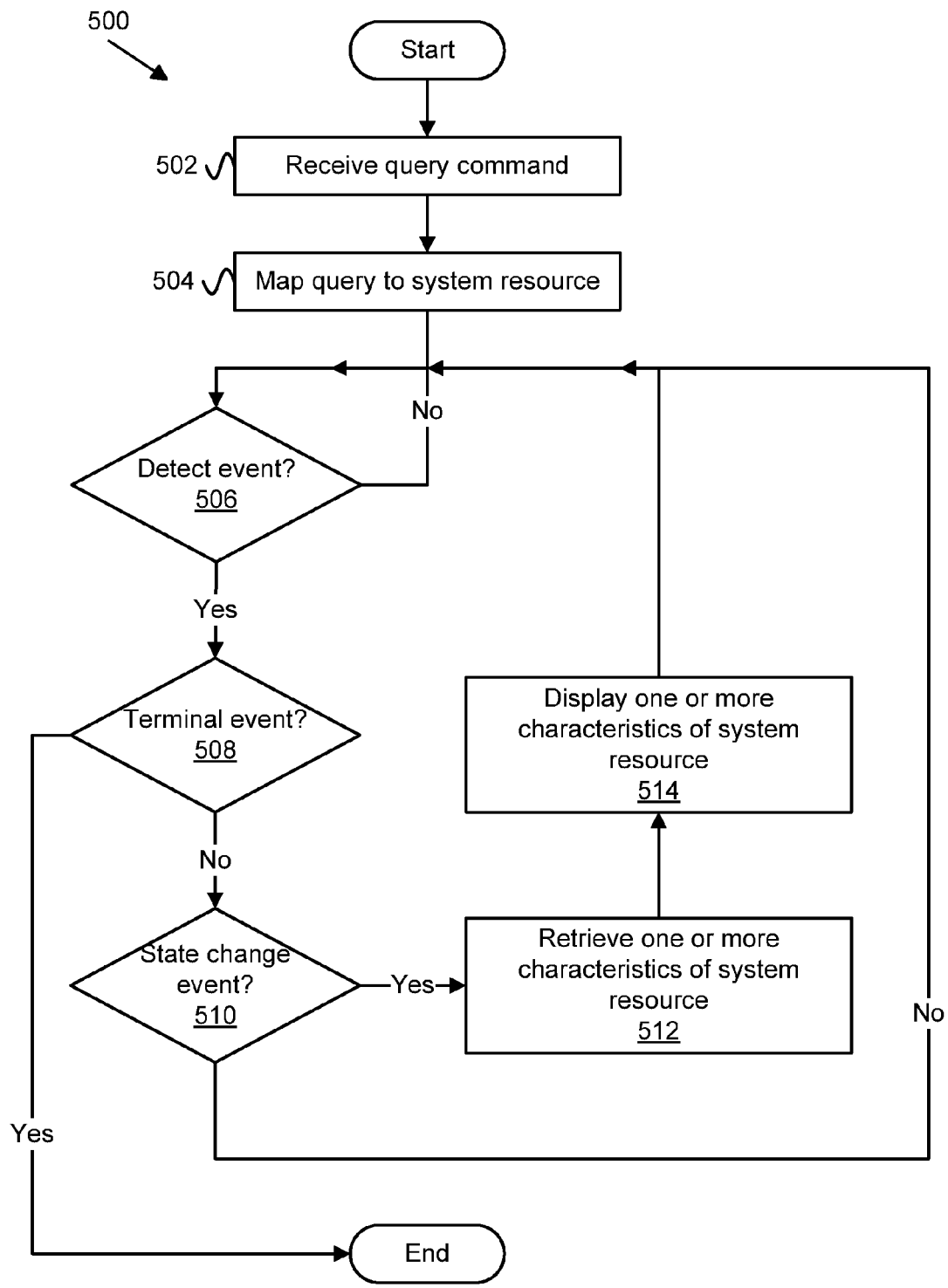
FIG. 5 is a schematic block diagram illustrating one embodiment of another method for dynamic monitoring of command line queries.

FIG. 5 is a schematic block diagram illustrating one embodiment of another method 500 for dynamic monitoring of command line queries. The method 500 begins and receives 502 a query command from a user. In one embodiment, the query command includes one or more of a command flags, parameters, or both. The method 500 maps 504 the query command to one or more system resources. The method 500 monitors for a state change event or a terminal event until a detection of a terminal event. The method determines 506 whether an event has been detected. If so, the method determines 508 whether the detected event is a terminal event. If the detected event is a terminal event, the method 500 ends. If the detected event is not a terminal event, the method 500 determines 510 whether the detected event is a state change event. If the detected event is a state change event, the method 500 retrieves 512 the one or more characteristics of the system resource that the state change event pertains to. The method 500 displays 514 the one or more characteristics retrieved to the user and then continues to monitor for a state change event or terminal event. In one embodiment, the method 500 displays 514 the value of each characteristic whose name matches a parameter accompanying the query command.

Figure 6:
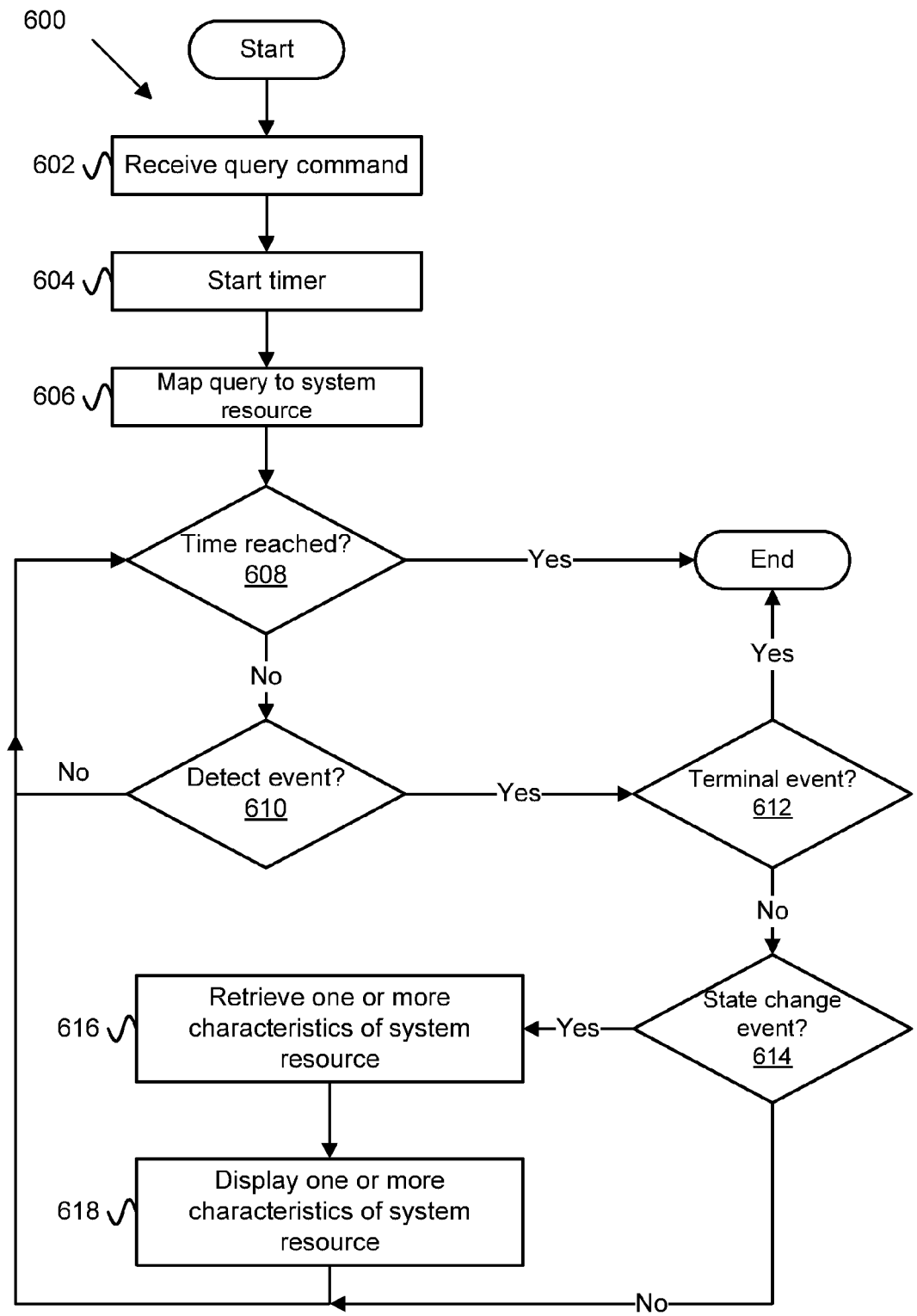
FIG. 6 is a schematic block diagram illustrating one embodiment of still another method for dynamic monitoring of command line queries.

FIG. 6 is a schematic block diagram illustrating one embodiment of still another method 600 for dynamic monitoring of command line queries. The method 600 begins and receives 602 a query command with a parameter that includes a time measurement from a user. In one embodiment, the query command includes one or more of a command flags, parameters, or both. The method 600 starts 604 a timer. The method 600 maps 606 the query command to one or more system resources. The method 600 determines 608 whether an amount of time equal to the time measurement has passed. If an amount of time equal to or more than the time measurement has passed, the method 600 ends. If an amount of time equal to or more than the time measurement has passed, the method 600 monitors for a state change event or a terminal event until a detection of a terminal event. The method determines 610 whether an event has been detected. If so, the method determines 612 whether the detected event is a terminal event. If the detected event is a terminal event, the method 600 ends. If the detected event is not a terminal event, the method 600 determines 614 whether the detected event is a state change event. If the detected event is a state change event, the method 600 retrieves 616 the one or more characteristics of the system resource that the state change event pertains to. The method 600 displays 618 the one or more characteristics retrieved to the user and then determines 608 whether an amount of time equal to or more than the time measurement has passed.

Figure 7:
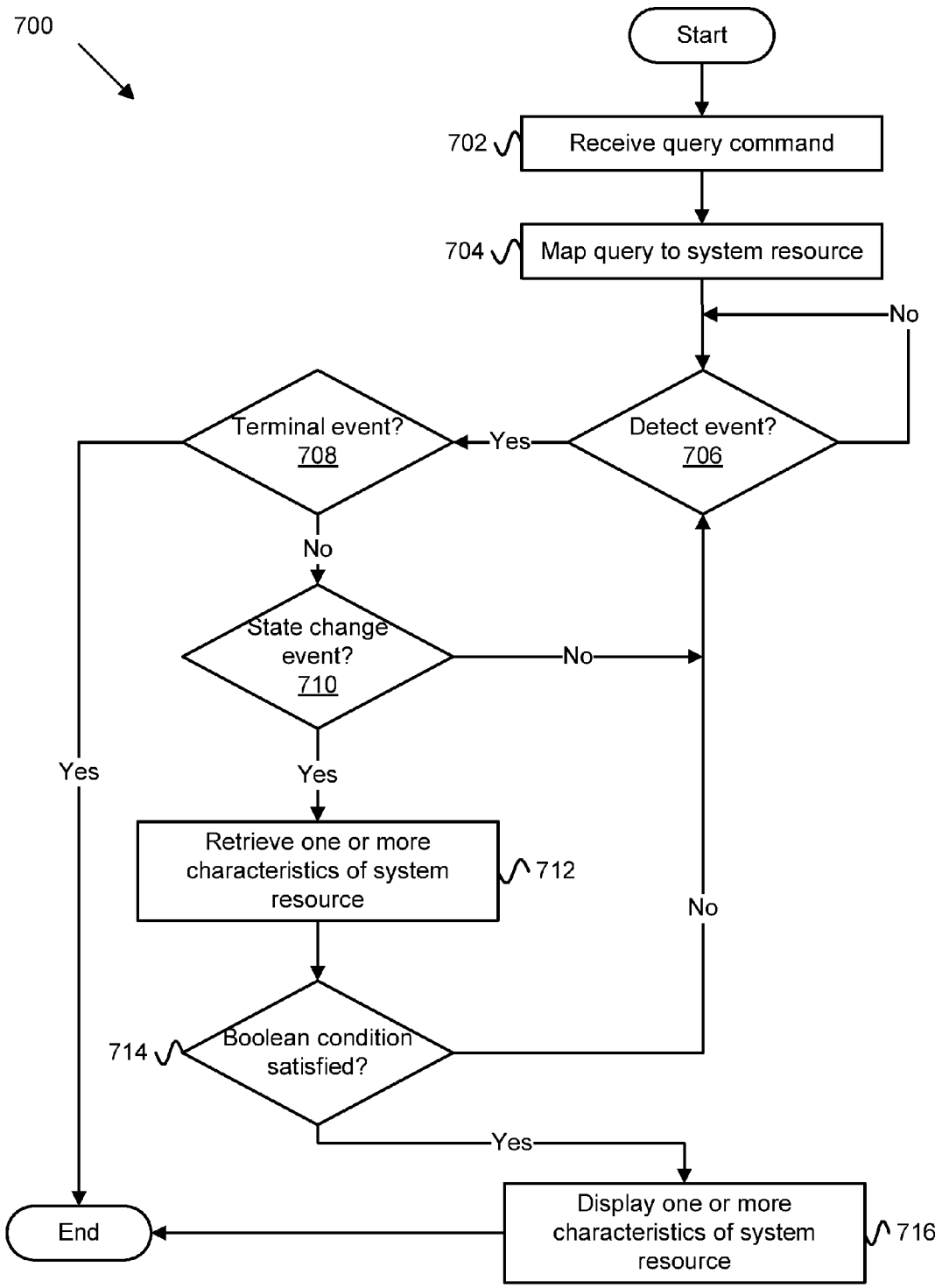
FIG. 7 is a schematic block diagram illustrating one embodiment of yet another method for dynamic monitoring of command line queries.

FIG. 7 is a schematic block diagram illustrating one embodiment of yet another method 700 for dynamic monitoring of command line queries. The method 700 begins and receives 702 a query command that includes a boolean condition from a user. In one embodiment, the query command includes one or more of a command flags, parameters, or both. The method 700 maps 704 the query command to one or more system resources. The method 700 monitors for a state change event or a terminal event until a detection of a terminal event. The method determines 706 whether an event has been detected. If so, the method determines 708 whether the detected event is a terminal event. If the detected event is a terminal event, the method 700 ends. If the detected event is not a terminal event, the method 700 determines 710 whether the detected event is a state change event. If the detected event is a state change event, the method 700 retrieves 712 the one or more characteristics of the system resource that the state change event pertains to and determines 714 whether the boolean condition is satisfied by the one or more characteristics. If the boolean condition is satisfied, the method 700 displays 716 the one or more characteristics retrieved to the user and the method 700 ends. In one embodiment, if the boolean condition is satisfied, the method 700 displays 716 the one or more characteristics retrieved to the user, generates a terminal event, and the method 700 ends. If the detected event is not a state change event or the one or more characteristics retrieved does not satisfy the boolean condition, the method 700 continues to monitor for a state change event or terminal event.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising computer readable code stored on a non-transitory computer readable storage medium, the computer program product configured to:
   receive a command at a command line interface, the command comprising a query and one or more parameters, wherein the one or more parameters comprise a boolean condition;
   map the command to a system resource during execution of the command by the command line interface, the system resource having a plurality of characteristics, wherein each characteristic of the plurality of characteristics comprises a name and value;
   monitor for a state change event pertaining to the system resource or a terminal event during execution of the command by the command line interface, the state change event corresponding to a change in the value of one or more characteristics of the plurality of characteristics;
   retrieve the one or more characteristics of the plurality of characteristics in response to detecting the state change event and display the one or more characteristics of the plurality of characteristics in the command line interface;
   determine whether the one or more characteristics satisfy the boolean condition;
   generate a terminal event in response to determining that the one or more characteristics satisfy the boolean condition, wherein the terminal event stops execution of the command; and
   cease monitoring for a state change event pertaining to the system resource in response to detecting the terminal event by stopping execution of the command in the command line interface.

2. The computer program product of claim 1, wherein retrieving the one or more characteristics of the plurality of characteristics in response to detecting the state change event comprises executing the query.

3. The computer program product of claim 1, wherein
   the state change event contains the one or more characteristics of the plurality of characteristics; and
   retrieving the one or more characteristics of the plurality of characteristics in response to detecting the state change event comprises extracting the one or more characteristics of the plurality of characteristics from the state change event.

4. The computer program product of claim 1, the computer program product further configured to display the one or more characteristics in response to determining that the one or more characteristics satisfy the boolean condition.

5. The computer program product of claim 1, further configured to display the one or more characteristics of the plurality of characteristics.

6. The computer program product of claim 5, wherein displaying the one or more characteristics of the plurality of characteristics comprises displaying the value of each characteristic whose name matches a parameter of the one or more parameters.

7. The computer program product of claim 1, wherein the one or more parameters comprises a time measurement; and the computer program product further configured to:
   generate the terminal event in response to detecting a passage of time equal to the time measurement.

8. A method comprising:
   receiving a command at a command line interface, the command comprising a query and one or more parameters, wherein the one or more parameters comprise a boolean condition;
   mapping the command to a system resource during execution of the command by the command line interface, the system resource having a plurality of characteristics, wherein each characteristic of the plurality of characteristics comprises a name and value;
   monitoring for a state change event pertaining to the system resource or a terminal event during execution of the command by the command line interface, the state change event corresponding to a change in the value of one or more characteristics of the plurality of characteristics;
   retrieving the one or more characteristics of the plurality of characteristics in response to detecting the state change event and displaying the one or more characteristics of the plurality of characteristics in the command line interface;
   determining whether the one or more characteristics satisfy the boolean condition;
   generating a terminal event in response to determining that the one or more characteristics satisfy the boolean condition, wherein the terminal event stops execution of the command; and
   ceasing to monitor for a state change event pertaining to the system resource in response to detecting the terminal event by stopping execution of the command in the command line interface.

9. The method of claim 8, wherein retrieving the one or more characteristics of the plurality of characteristics in response to detecting the state change event comprises executing the query.

10. The method of claim 8, wherein
   the state change event contains the one or more characteristics of the plurality of characteristics; and
   retrieving the one or more characteristics of the plurality of characteristics in response to detecting the state change event comprises extracting the one or more characteristics of the plurality of characteristics from the state change event.

11. The method of claim 8,
   the method further comprising:
      displaying the one or more characteristics in response to determining that the one or more characteristics satisfy the boolean condition.

12. The method of claim 8, further comprising displaying the one or more characteristics of the plurality of characteristics.

13. The method of claim 12, wherein displaying the one or more characteristics of the plurality of characteristics comprises displaying the value of each characteristic whose name matches a parameter of the one or more parameters.

14. The method of claim 8, wherein the one or more parameters comprises a time measurement; and the method further comprising:
   generating the terminal event in response to detecting a passage of time equal to the time measurement.

15. A system comprising:
   a server;
   a command line interface configured to receive a command comprising a query and one or more parameters, wherein the one or more parameters comprise a boolean condition;
   a monitoring apparatus configured to be executed in the command line interface by the command, the monitoring apparatus comprising:
      a resource identification module that maps the command to a system resource, the system resource having a plurality of characteristics, wherein each characteristic of the plurality of characteristics comprises a name and value;
      a listener module that monitors for a state change event pertaining to the system resource or a terminal event, the state change event corresponding to a change in the value of one or more characteristics of the plurality of characteristics, the listener module ceasing to monitor for a state change event in response to detecting a terminal event by stopping execution of the command in the command line interface;
      a data collection module that retrieves the one or more characteristics of the plurality of characteristics in response to the listener module detecting the state change event and displays the one or more characteristics of the plurality of characteristics in the command line interface;
      an evaluation module that determines that the one or more characteristics satisfy the boolean condition; and
      a signal module that generates a terminal event in response to the evaluation module determining that the one or more characteristics satisfy the boolean condition, wherein the terminal event stops execution of the command in the command line interface.

16. The system of claim 15, wherein the data collection module retrieves the one or more characteristics of the plurality of characteristics in response to the listener module detecting the state change event comprises executing the query.

17. The system of claim 15, wherein
   the state change event contains the one or more characteristics of the plurality of characteristics; and
   data collection module retrieves the one or more characteristics of the plurality of characteristics in response to the listener module detecting the state change event comprises extracting the one or more characteristics of the plurality of characteristics from the state change event.

18. The system of claim 15, further comprising an output module that displays the one or more characteristics in response to the evaluation module determining that the one or more characteristics satisfy the boolean condition.

19. The system of claim 15, further comprising an output module that displays the one or more characteristics of the plurality of characteristics.

20. The system of claim 19, wherein the output module displays the one or more characteristics of the plurality of characteristics comprises displaying the value of each characteristic whose name matches a parameter of the one or more parameters.

* * * * *